US008756145B2

(12) United States Patent
Hamilton, II et al.

(10) Patent No.: US 8,756,145 B2
(45) Date of Patent: Jun. 17, 2014

(54) METHOD AND SYSTEM FOR VENDOR-NEUTRAL SUBCONTRACTOR ENABLEMENT

(75) Inventors: Rick A. Hamilton, II, Charlottesville, VA (US); Konstantinos Makropoulos, Toronto (CA); Bryan J. Martin, Dunedin, FL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 12/025,255

(22) Filed: Feb. 4, 2008

(65) Prior Publication Data
US 2009/0198536 A1 Aug. 6, 2009

(51) Int. Cl.
*G06Q 40/00* (2012.01)
(52) U.S. Cl.
USPC .................................. 705/37; 705/7
(58) Field of Classification Search
USPC ........................................................ 705/37
See application file for complete search history.

(56) References Cited

U.S. PATENT DOCUMENTS

| 7,080,064 B2 | 7/2006 | Sundaresan |
| 7,099,859 B2 | 8/2006 | Sundaresan |
| 7,249,085 B1* | 7/2007 | Kinney et al. ............... 705/37 |
| 2002/0077954 A1* | 6/2002 | Slaight et al. ............... 705/37 |
| 2003/0083914 A1* | 5/2003 | Marvin et al. ............... 705/7 |
| 2003/0187763 A1 | 10/2003 | Jordan et al. |
| 2004/0064351 A1* | 4/2004 | Mikurak ............... 705/7 |
| 2006/0136324 A1 | 6/2006 | Barry et al. |
| 2006/0136325 A1 | 6/2006 | Barry et al. |
| 2006/0190391 A1 | 8/2006 | Cullen, III et al. |

OTHER PUBLICATIONS

Seubert Michael; Consistent Set of Interfaces Derived from a Business Object Model; Jun. 4, 2004; WIPO/Thomson; 12/3K/2 (Item 2 from file:349).*
Chatter Mukesh; Method & Apparatus for Web-Based E-Commerce; Oct. 16, 2007; WIPO/Thomson; 18/3K/1 (Item 1 from file: 349).*
Veeraraghavan Puthucode Subramanyan; A System and Method for Providing a Futures/Forward Tradable Market and Bidded Price Negotiation; WIPO/Thomson; 18/3K/2 (Item 2 from file: 349).*
Wu, R. et al., "A Game Model for Selection of Purchasing Bids in Consideration of Fuzzy Values", Services Systems and Services Management, 2005, vol. 1, pp. 254-258.
"Data Servers. Teaming with Business Partners, IBM Information Management Software", URL: http://www-306.ibm.com/software/data/partners/public.jsp?tab=data-servers&content=sal..., pp. 1-10, Downloaded Nov. 26, 2007.
"Benefits and Resources", PartnerWorld Technical Benefits, URL: www-1.ibm.com/partnerworld/pwhome.nsf/weblook/ben_trs.html, pp. 1-3, Downloaded Nov. 26, 2007.

(Continued)

*Primary Examiner* — Olabode Akintola
*Assistant Examiner* — Michael Cranford
(74) *Attorney, Agent, or Firm* — John Pivnichny; Roberts Mlotkowski Safran & Cole, P.C.

(57) ABSTRACT

A method implemented in a computer infrastructure having computer executable code, includes receiving information in support of a bid and determining if value-add eligibility criteria is met. Additionally, the method includes calculating a bid price based on the information if the value-add eligibility criteria is met, updating a record indicating the bid price and tracking additions and changes to the record.

24 Claims, 4 Drawing Sheets

(56) References Cited

OTHER PUBLICATIONS

"Innovators helping Innovators: IBM, Sefas Innovation and DataSynapse prove grid-enables solution for Hewitt Associates", PartnerWorld, IBM Solutions Grid for Business Partners, 2004, 4 Pgs.

"IBM Arms Business Partners to Drive Growth for Mid-Sized Companies Using SOA", IBM Press Room, Mar. 13, 2006, URL: http://www-03.ibm.com/press/us/en/pressrelease/19364.wss, pp. 1-4.

"IBM adds products to Express Advantage offerings", Enterprise Networks & Servers, Nov. 2006, http://www.enterprisenetworksandservers.com/monthly/art.php?2527, pp. 1-6, Downloaded Nov. 26, 2007.

"PartnerWorld Industry Networks: Technical", URL: http://www-304.ibm.com/jet09002c/isv/marketing/industrynetworks/technical.html, pp. 1-2, Downloaded Nov. 26, 2007.

"Becoming An SAP Partner: SAP Channel Partners", URL: http://www.sap.com/ecosystem/partners/become/channel/index.epx, p. 1-1, Downloaded Nov. 26, 2007.

* cited by examiner

300

| Activity or Document | Point Value |
|---|---|
| Record opened date | 1 point per month of difference |
| Config Review or SAR completed | 5 points |
| Architecture overview document | 3 points |
| Architecture detail document | 10 points |
| Architecture diagram | 2 points |
| Client recommendation letter | 2 points |

| Activity or Document | VendorA | VendorB |
|---|---|---|
| Record opened date | 2 | 0 |
| Config Review or SAR completed | 5 | 5 |
| Architecture overview document | 3 | 3 |
| Architecture detail document | 10 | 10 |
| Architecture diagram | 2 | 2 |
| Client recommendation letter | 2 | 0 |
| Total BVC Score | 24 | 20 |

Figure 4

METHOD AND SYSTEM FOR VENDOR-NEUTRAL SUBCONTRACTOR ENABLEMENT

FIELD OF THE INVENTION

The present invention generally relates to a method and system for managing and enabling subcontractors and/or vendors who are competing for a same client sales opportunity, and more specifically, to a method and system for managing and enabling a vendor-neutral bid process for the same client sales opportunity.

BACKGROUND OF THE INVENTION

An organization, for example, a company (e.g., a television manufacturer) may manufacture a product for sale to a final customer. However, rather than making a direct sale to the final customer, the organization may use vendors (e.g., retail stores) to make the sale to the customer. That is, the organization may sell the product to the vendor, and the vendor, in turn, may sell the product to the final customer. Additionally, vendors may discover a sales opportunity (e.g., a client contacts the vendor requesting, e.g., a product) and submit a request, or bid, to purchase the product from the organization, so that the vendor may sell the product to the client. Often, there may be a plurality of vendors competing for the same sales opportunity. However, the organization may choose only some of the vendors, among the plurality of vendors, for the sales opportunity.

In deciding which vendors to use for the sales opportunity, e.g., to distribute a product to the final customers, an organization may use a bid process. A bid process may be open for a period of time, e.g., three months, in which vendors, competing for the same sales opportunity, may submit information in support of their bid. For example, a vendor may submit data indicating that they are capable of meeting a client's (e.g., a final customer's) requirements or needs. Additionally, a vendor may submit data reflective of successful past sales, or business development actions taken with a particular client.

Furthermore, when selling to a vendor, it is customary for the organization to give the vendor a discount (e.g., a wholesale price versus a retail price). The vendor may then sell the product to the final customer at a higher price (e.g., a retail price). Additionally, the organization may segment their pricing and have more than one discount price for selling the product to the vendor. More specifically, the organization may have different tiers of pricing. For example, the organization may have four tiers of pricing for their vendors, wherein "tier one" is the list price or retail price, "tier two" is an entitled price, e.g., a wholesale price, "tier three" is a better price than "tier two", and "tier four" is the lowest possible price. Moreover, "tier two" may be the standard pricing given to vendors. However, vendors may request a better (special) price (e.g., "tier three" or "tier four" pricing) from the organization. For example, if a particular vendor has had great success in selling the product and has met sales goals, the organization may offer that particular vendor a better price. This is advantageous for the vendor, as they may pass the discount on to the final customer and possibly make a greater number of sales, or they may charge the same amount as other vendors (who purchased from the organization at a higher pricing tier) and realize greater profits.

Thus, during a bid process, an organization may decide which vendors will be used for the sales opportunity. Moreover, the organization may decide to offer different vendors different pricing tiers. These determined pricing tiers offered to different vendors may be available to those vendors for a limited period of time, e.g., three months, within which a vendor must close the deal with the client, and after which a vendor would need to complete the bid process again.

However, organizations (generally referred to as Company XYZ in this disclosure) often have a difficult time when selecting between competing vendors, such as: internal service providers, Global System Integrators (GSI), Local System Integrators (SI), Industry Solution Vendors (ISV), and other Business Partners (BP), to provide their products and services to the end customers. As an example, Bank 1 may be a Company XYZ technology customer and have relationships with Vendor A and Vendor B. When Bank 1 requires new technology, they may likely contact both Vendor A and Vendor B who are both resellers of Company XYZ technology products and services. In such cases where multiple vendors are interested in pursuing the technology sale to a client, e.g., Bank 1, Company XYZ must determine each vendor's eligibility and then evaluate each vendor's influence and contribution to a successful sale and deployment to determine if any vendor will be offered a special discount pricing.

It is important for organizations, e.g., Company XYZ, to maintain excellent relationships with all of their vendors, e.g., Vendor A and Vendor B, in order to maintain and grow business. In order to maintain excellent relationships with all of their vendors, each vendor must view the organization as a neutral evaluator of a standard process, and not an influencer of the competitive outcome. However, in deciding the terms of sale for each of the vendors, an organization may give one of the vendors more favorable terms (or less favorable terms) as compared to another vendor based on the organization's assessment of which vendor has best influenced and prepared for the sale and deployment to the client. For example, in some situations, an organization, e.g., Company XYZ, may provide different pricing to such competing vendors, e.g., Vendor A and Vendor B, based on which vendor(s) Company XYZ has determined to have best influenced and prepared for the sale and deployment.

However, without a standardized, well understood, and impartial mechanism for recording and evaluating vendor eligibility, influence, and preparedness with respect to any individual sales opportunity, vendor relationships with the organization may be harmed, where one or more vendors may not feel that an impartial decision has been made. For example, using conventional manual practices, two different representatives of Company XYZ may look at the same request for a particular vendor, but come to different conclusions, e.g., different pricing tiers.

Moreover, where a lack of defined evaluation criteria and data exists, it is often not possible for the organization to determine which vendor should receive favorable pricing or sales assistance. As such, a "no win" situation may arise where all competing vendors receive the same treatment from Company XYZ, as it is not clear that any single vendor has better prepared to perform than any other.

Accordingly, there exists a need in the art to overcome the deficiencies and limitations described hereinabove.

SUMMARY OF THE INVENTION

In a first aspect of the invention, a method implemented in a computer infrastructure having computer executable code, comprises receiving information in support of a bid and determining if value-add eligibility criteria is met. Additionally, if the value-add eligibility criteria is met, the method further comprises calculating a bid price based on the information and updating a record indicating the bid price. Furthermore, the method comprises tracking additions and changes to the record.

In another aspect of the invention, a system comprises a bid certification tool vendor interface configured to provide a uniform interface to add or modify information in a bid certification tool record in support of a bid, a form loader tool configured to translate the information, when necessary, prior to adding the information to the bid certification tool record, and a value-add eligibility determination tool configured to determine whether value-add eligibility criteria is met based on the information. Additionally, the system comprises a bid pricer tool providing an interface with a pricing tool configured to determine a standard price based on the information and a bid value calculation tool configured to determine a bid value calculation score based on the information and update the bid certification tool record to indicate a special pricing.

In another aspect of the invention a computer program product comprises a computer usable medium having readable program code embodied in the medium. The computer program product includes at least one component to receive information in support of a bid in a bid certification tool record and determine if value-add eligibility criteria is met. Additionally, the at least one component is configured to calculate a bid price based on the information if the value-add eligibility criteria is met and update the bid certification tool record indicating the bid price. Moreover, the at least one component is configured to track additions and modifications to the bid certification tool record.

BRIEF DESCRIPTION OF THE DRAWINGS

The present invention is described in the detailed description which follows, in reference to the noted plurality of drawings by way of non-limiting examples of exemplary embodiments of the present invention.

FIG. 3 shows an exemplary point value table in accordance with the invention;

FIG. 4 shows an exemplary bid value calculation score table in accordance with the invention.

DETAILED DESCRIPTION OF EMBODIMENTS OF THE INVENTION

The invention is directed to a method and system for managing and enabling subcontractors and/or vendors who are competing for the same client sales opportunity, and more specifically, to a method and system for managing and enabling a vendor-neutral bid process for the same client sales opportunity.

Using current manual techniques and methods, sales professionals of an organization, e.g., a company, often access tools, such as the IBM® Bid Certification Tool (BCT), to make vendor decisions within a very short time frame in order to meet the delivery needs of a customer or client. (IBM is a registered trademark of International Business Machines Corporation in the United States, other countries, or both.) Where multiple vendors claim the right to favored treatment through the BCT process, and documentation is limited or nonexistent, this often results in much manual effort on the part of the sales team professionals of the organization or company in, e.g., rehashing phone conversations, reviewing email messages, and otherwise trying to determine which vendors were involved in eligible activities on behalf of the client and deserve favorable status. That is, such information is manually collected, manually tracked, and manually recorded as part of the bid certification process.

This invention provides a software architecture, interface, and system and method for evaluation of vendors competing for the same client sales opportunity. Implementing the invention provides a software architecture, unique logic elements, and multiple embodiments to automate, enhance, and improve upon existing bid certification process systems and methods. In embodiments, the invention may be deployed as an enhanced version of existing tools such as, for example, IBM BCT, or may be a new software product. By implementing the invention, the use of time resources, accuracy, and personal neutrality involved in the bid process are all greatly improved, providing a more balanced bid environment which results in better relationships between vendors and the organization, e.g., the company, and also amongst the vendors themselves.

System Environment

Figure 1:
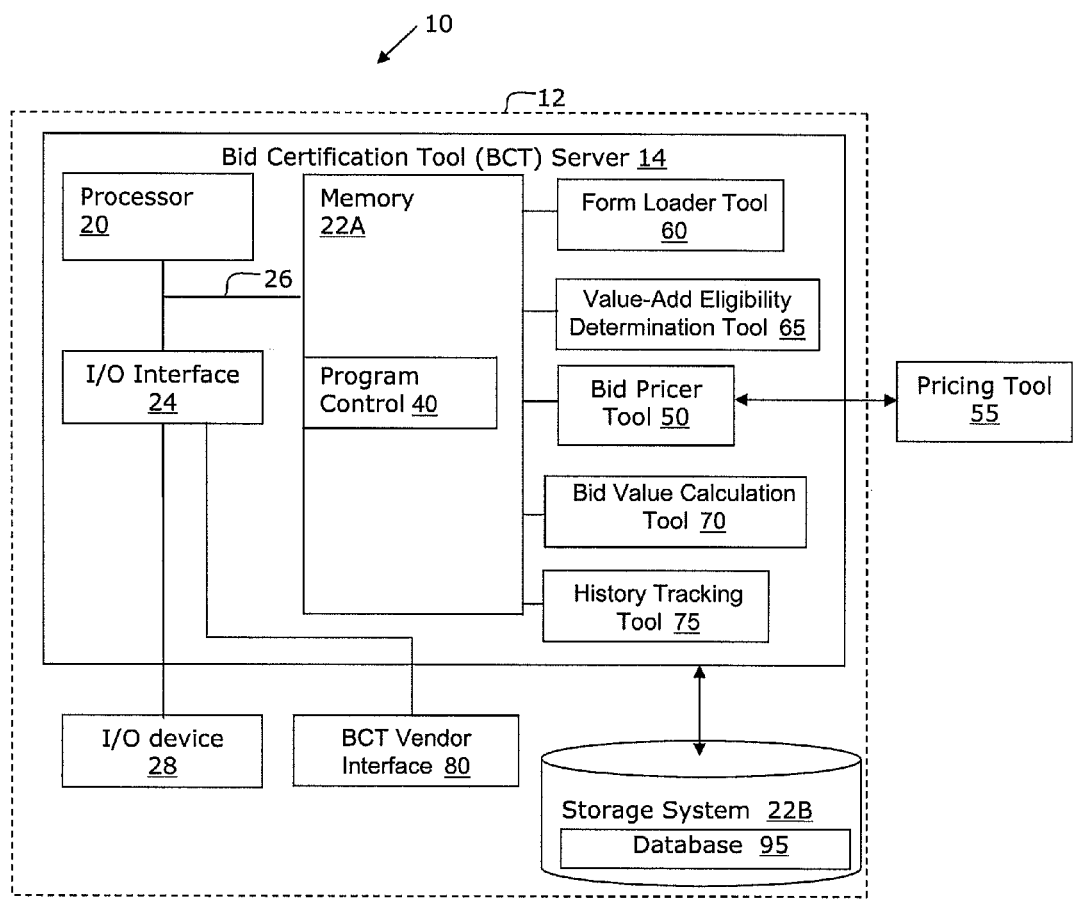
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. The computer infrastructure 12 includes a computing device (or bid certification tool (BCT) server) 14 that comprises a form loader tool 60, a bid pricer tool 50, a value-add eligibility determination tool 65, a bid value calculation (BVC) tool 70, and a history tracking tool 75. The computing device (or BCT server) 14 is in communication with a bid certification tool (BCT) vendor interface 80. The BCT vendor interface 80 provides vendors the ability to connect to the computing device 14 (or BCT server) to add and/or update data in the computing device (or BCT server) 14. Also, the computing device 14 is in communication with a pricing tool 55 via the bid pricer tool 50. In embodiments, the bid pricer tool 50 provides an application programming interface (API) between the pricing tool 55 and the computing device (or BCT server) 14. These tools are operable to translate documents when transferring information from the BCT vendor interface 80 to the computing device (or BCT server) 14, interface with the pricing tool 55, determine if a vendor meets value-add eligibility criteria, determine a price for a vendor, and track changes to the data entered by vendors, e.g., the processes described herein.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution.

Further, the computing device (or BCT server) 14 is in communication with an external I/O device/resource 28. The external I/O device/resource 28 may be keyboards, displays, pointing devices, etc. The I/O device 28 can interact with the computing device 14 or any device that enables the computing device 14 to communicate with one or more other computing devices using any type of communications link. Additionally, in embodiments, the computing device 14 includes a storage system 22B. Storage system 22B may contain a database 95 for use by the computer infrastructure 12, as discussed further below.

The processor 20 executes computer program code (e.g., program control 40), which is stored in the memory 22A and/or the storage system 22B. While executing computer program code, the processor 20 can read and/or write data to/from the memory 22A, the storage system 22B, and/or the I/O interface 24. The bus 26 provides a communications link between each of the components in the computing device (or BCT server) 14.

The computing device (or BCT server) 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device (or BCT server) 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Moreover, according to an aspect of the invention, the components (e.g., the form loader tool 60, the bid pricer tool 50, the value-add eligibility determination tool 65, the bid value calculation (BVC) tool 70, the history tracking tool 75, and the BCT vendor interface 80) may be created in a software tool set that is compliant with service-oriented architecture (SOA) guidelines for software development. SOA is an architectural style where existing or new functionalities are grouped into atomic services. These services communicate with each other by passing data from one service to another, or by coordinating an activity between one or more services. More specifically, SOA is an architecture that relies on service-orientation as its fundamental design principle. In an SOA environment, independent services can be accessed without knowledge of their underlying platform implementation. Put another way, SOA is the practice of segregating the core business functions into independent services that do not change frequently. SOA architecture utilizes modular functional logic blocks and loosely coupled interfaces. By implementing the invention with an SOA compliant design, the invention may be easily deployed in independent software modules, and may be readily enhanced and maintained.

BCT Vendor Interface

The BCT vendor interface 80 provides an interface for vendors to connect to the computing device (or BCT server) 14 and insert and update data and/or documents in support of, e.g., a Company XYZ client sale opportunity. In embodiments, the BCT vendor interface 80 may be a remote software module designed for, and able to connect to and directly communicate with the computing device (or BCT server) 14 using well known protocols. In an alternate embodiment, the BCT vendor interface 80 may be a web-based interface utilizing well known data transfer languages and protocol, such as, for example, hypertext transfer protocol (HTTP), file transfer protocol (FTP), secure shell (SSH), and extensible markup language (XML). In yet another embodiment, a vendor may submit data in various document formats, without the BCT vendor interface 80, e.g., either on paper or electronically, and, e.g., fed or scanned into the BCT server 14 using known methods.

Using the BCT vendor interface 80 allows a vendor to access the BCT server 14 to, e.g., upload and/or update documents in support of themselves in the bid process. The BCT vendor interface 80 provides a uniform system for vendors to submit evidentiary support for their bid. The BCT vendor interface 80 also allows for a system in which each vendor is responsible for documenting their own record (in the BCT server 14) in support of their bid. By providing a system in which the vendors are responsible for managing their bid support documents, this work may be shifted from the organization, e.g., the company, to the vendors. This may reduce or eliminate the workload of the organization, and consequently reduce costs to the organization.

In order for the organization to keep track of which submitted information, e.g., documents, belong to which vendors, in embodiments, the organization may assign each vendor a unique opportunity number. The opportunity number is a uniform tracking mechanism for the bid process. More specifically, when a vendor initially contacts an organization, e.g., a company, requesting to resell to a client (e.g., purchase from the company for sale to the client), the company may assign the vendor an opportunity number. Thus, when the vendor submits any bid information to the BCT server 14 (e.g., via the BCT vendor interface 80), the vendor identifies that bid information with the opportunity number to associate the bid information with the vendor. Moreover, the database 95 may utilize the opportunity number when storing the submitted bid information. Also, in embodiments, when the vendor initially contacts an organization, e.g., a company, requesting to resell to a client the vendor may complete and submit a resell request form.

Form Loader Tool

The form loader tool 60 is responsible for any document and data translation that may be required to load data from the BCT vendor interface 80 to the BCT server 14. In an embodiment, the BCT vendor interface 80 may connect directly to the BCT server 14, and no form loading service (e.g., translation) by the form loader tool 60 would be necessary. However, in an alternate embodiment, in which, for example, the BCT vendor interface 80 is a web-based interface, the form loader tool 60 translates inbound web page content to the BCT server 14. In yet another embodiment, paper or electronic documents may be, e.g., scanned or read, translated, and loaded as server records in the BCT server 14 by the form loader tool 60. Many techniques for scanning, loading, and translating data are known in existing art.

Value-Add Eligibility Determination Tool

The value-add eligibility determination tool 65 determines whether each of the vendors meets any value-add eligibility criteria of the client. It is generally desirable for companies, such as XYZ, to resell through vendors who add value to the target client (e.g., the final customer). As such, the first step in the vendor evaluation process is to ensure that competing vendors all meet value-add eligibility criteria. Depending on embodiments, a vendor who is not able to meet all or a portion of the client's value-add eligibility criteria may be eliminated from consideration in the bid process.

The value-add eligibility criteria may be determined by the client prior to the bid process. Moreover, the value-add eligibility criteria may be altered at any time by, for example, the client, the organization, or a service provider. However, in embodiments, the value-add eligibility criteria may remain static through a bid process. Such value-add eligibility criteria may vary greatly according to industry, type of sale, complexity of sale, and other such information. In general, however, value-add eligibility criteria may include services and support required by or beneficial to a given client. In embodiments, value-add eligibility criteria may include: client agreements with the company (e.g., setting forth that only certain vendors may do business with the client); particular skills (e.g., installation skills or software skills); and certifications (e.g., a certified install specialist), amongst other criteria.

In embodiments, the value-add eligibility determination tool 65 may access a relational database (RDB), e.g., database 95, and read vendor value-add data relative to the target client in order to determine whether the vendors meet the value-add eligibility criteria. More specifically, during the bid process a vendor may utilize the BCT vendor interface 80 to review the value-add eligibility criteria of a particular client, and indicate whether the vendor is able to meet each of the value-add eligibility criteria. The vendor's indications of their ability to meet the value-add eligibility criteria may be stored in the database 95. With this information in the database 95, the BCT server 14 may compile a value-add table which indicates each of the client's value-add eligibility criteria and an indication of whether each of the vendors is able to meet each of the client's value-add eligibility criteria.

Figure 2:
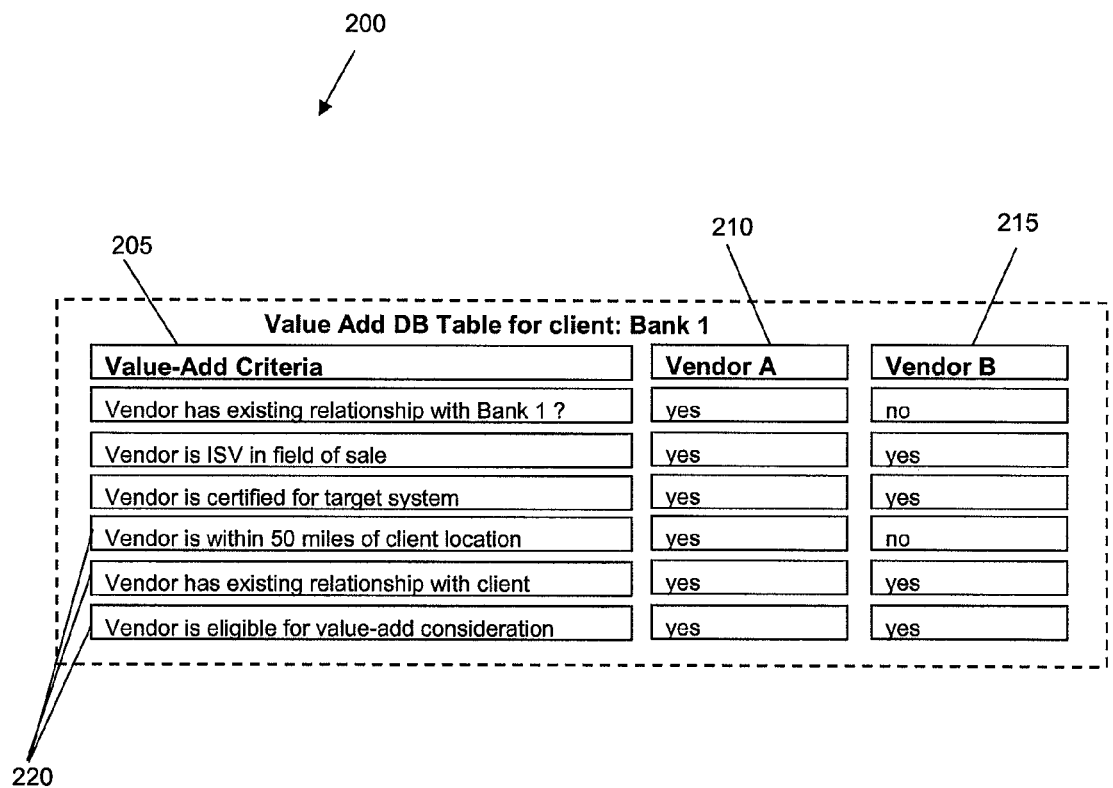
FIG. 2 shows an exemplary value-add table in accordance with the invention.

FIG. 2 provides a representation of an exemplary value-add table 200. It should be understood that FIG. 2 is one of many potential architectural models for the presentation of value-add eligibility criteria, and, as such, should not limit the scope of the present invention. In embodiments, the value-add table 200 may be stored in a relational database, e.g., database 95.

As shown in FIG. 2, the value-add table 200 includes columns for "Value-Add Criteria" 205, "Vendor A" 210 and "Vendor B" 215. (It should be understood that the value-add table would include a vendor column for each vendor under consideration in the bid process.) Additionally, the value-add table 200 includes rows 220 for each of the value-add criteria. More specifically, the "Value-Add Criteria" column 205 contains the criteria of a particular client (e.g., Bank 1). "Vendor A" column 210 and "Vendor B" column 215 are used to indicate whether Vendor A and Vendor B meet each of the client's criteria. Thus, as shown in FIG. 2, with this exemplary value-add table 200, Vendor A is able to meet all of the client's criteria and Vendor B is not able to meet two of the client's criteria.

Those skilled in the art will realize that many different criteria can be considered as adding value to a client, only a small portion of which are listed in FIG. 2 as examples. Many specific criteria (or requirements) will vary based on the target client, industry, and type of sale, amongst other parameters. As an example, a technology company may only outsource implementation of specific products and services to vendors certified by a governing authority in that specific field. For instance, with one example, only vendors certified to deploy the IBM DB2 Universal Database™ would be eligible for a sales opportunity that included this requirement. (DB2 Universal Database is a trademark of International Business Machines Corporation in the United States, other countries, or both.)

In one embodiment, a vendor would have to meet all of the value-add eligibility criteria of a client to be eligible for the competitive sales opportunity. That is, if a vendor is not able to meet any of the client's value-add eligibility criteria, then the vendor will be eliminated from consideration in the bid process. In another embodiment, the vendor would have to meet only key value-add eligibility criteria. That is, for example, the client or the organization may segment the value-add eligibility criteria into, e.g., key value-add eligibility criteria and secondary value-add eligibility criteria and a vendor must only meet the key value-add eligibility criteria to remain in the bid process. In yet another embodiment, the vendor would need to meet a predefined percentage, e.g., seventy-five percent, of the value-add eligibility criteria in order to remain eligible.

In an additional embodiment, the key field values (e.g., data in columns 210 and 215) may be used by the BVC tool 70 to determine a bid value score, as described further below. Moreover, the key field values may automatically favor one vendor over another vendor. For example, if one vendor already has a relationship with the client, and another vendor does not, the first vendor may receive additional credit towards their bid value score (as described below).

Bid Pricer Tool

The bid pricer tool 50 provides an electronic interface or application programming interface (API) between an organization's existing pricing tool 55 and the BCT server 14. Using the bid pricer tool 50, the prices determined by the pricing tool 55 may be input into the BCT server 14 and/or the database 95 for use by the BVC tool 70, as described further below.

An organization may use the organization's existing pricing tool 55 to determine which pricing each of the vendors may be offered. For example, as explained above, the organization may have four tiers of pricing for their vendors, wherein "tier one" is the list price or retail price, "tier two" is an entitled price (e.g., a wholesale price), "tier three" is a better price than "tier two", and "tier four" is the lowest possible price. Moreover, "tier two" may be the standard pricing given to vendors.

Additionally, database entries may exist for any standard discounting specific to the vendor or the type of sale. In embodiments, the bid price tool 50 would apply such discounts to the standard pricing. For example, a vendor may have a partnership contract that provides for a five percent discount. The bid process tool 50 applies the discount to the pricing determined by the pricing tool 55.

Bid Value Calculation Tool

The bid value calculation (BVC) tool 70 determines whether any of the vendors may receive a special pricing, e.g., a pricing less than the pricing determined by the pricing tool 55 in conjunction with the bid pricer tool 50. In order to make this determination of special pricing, the BVC tool 70 may evaluate and quantify the relative merits of each of the vendors competing for the same business opportunity.

More specifically, the BVC tool 70 determines the relative value of a given vendor's bid based on predefined points assigned to completed sales differentiators, activities and/or documents. Additionally, where multiple vendors are competing for the same sales opportunity, the BVC tool 70 may calculate values based on comparative data between vendors, such as, for example, which vendor was engaged earliest in the sales process. In such a points-based system, in embodiments, a higher value may be assigned to sales differentiators, documents and activities that are most important to the organization, e.g., Company XYZ, and items of lesser importance may be worth fewer points. In embodiments, when the deadline for a bid submission has arrived, the vendor with the most points would be declared winner of the BVC process. The winner of the BVC process may be a offered special pricing, for example, less than the standard pricing determined by the pricing tool 55 in conjunction with the bid pricer tool 50, e.g., a lower pricing tier.

In embodiments, if a vendor would like to request a special pricing, the vendor may submit a special pricing request form. Additionally, as explained above, vendors may submit and/or update information in the BCT server 14 via the BCT vendor interface 80. Thus, a vendor may submit BVC comparative data, e.g., completed sales differentiators, activities and/or documents, to the BCT server 14 for evaluation by the BVC tool 70. Moreover, vendors may submit the BVC comparative data at any time during the bid process, e.g., directly after an activity occurs or in real time. As explained above, the vendors may identify their submitted data with their unique opportunity number.

FIG. 3 shows an exemplary point-value table 300 having entries for such a points-based system system. It should be understood that FIG. 3 is one of many potential architectural models for a point-value table, and, as such, should not limit the scope of the present invention. As shown in FIG. 3, the point-value table 300 includes an "Activity or Document" column 305 and a "Point Value" column 310. Additionally, the point-value table contains rows 315 for each sales differentiator, activity or document. More specifically, the "Activity or Document" column 305 identifies an organization's BVC comparative criteria, for example, sales differentiators, activities or documents that, e.g., the organization determines to be important in serving the client. The "Point Value" column 310 contains the point value assigned to the associated sales differentiator, activity or document. As explained above, these point values may be determined by, e.g., the organization, the client or a service provider. The point-value table 300 may be stored in a database, e.g., the database 95. Moreover, a vendor may access the point-value table 300 to determine those BVC comparative criteria, e.g., completed sales differentiators, activities and/or documents, that the vendor may submit to the BVC server 14 to increase their BVC score, as explained further below.

As shown in FIG. 3, the sales differentiators, activities or documents may include, for example, a record opened date, a configuration review or system assurance review (SAR) completed, an architecture overview document, an architecture detail document, an architecture diagram, and a client letter, amongst other sales differentiators, activities or documents. More specifically, as shown in the exemplary point-value table 300 of FIG. 3, a vendor receives one point per month of difference in record opened date as compared to the other vendors involved in the bid process. A vendor may be given more points for having an earlier opened date, as having an earlier opened record date indicates to the organization, e.g., Company XYZ, that the vendor has been invested in the bid process for a longer period of time and involved with the customer for this particular sales opportunity for a longer period of time. Accordingly, the vendor likely has a more mature bid, e.g., more fully developed architecture. In an alternative embodiment, a vendor with the earliest opened record date may receive zero points and every other vendor may receive a point deduction per month for each month past the earliest opened record date their respective opened record date occurred.

Additionally, as shown in FIG. 3, for example, a vendor may receive five points for a completed configuration review or system assurance review (SAR). A company may have, for each type of equipment, a SAR that sets forth what a vendor should have considered in putting together a particular architecture for a client. If the vendor has completed, e.g., the SAR, then that vendor is more prepared than a vendor who has not completed a SAR. Thus, a vendor will receive a higher BVC score if the SAR has been completed.

The BVC comparative data, in embodiments, may be stored in a relational database, e.g., database 95, for easy association, access, and comparison of data. As previously stated, an organization's BVC comparative criteria (e.g., completed sales differentiators, documents and activities) may vary greatly and only a subset of possible considerations have been listed. Additionally, values assigned to particular criteria may also vary greatly. As an example, a company that derives substantial income from repeat business may value a client relationship much more than another company that primarily conducts one time sales or services. Thus, the point values may reflect the company's relative weighting of these different BVC comparative criteria. Additionally, such criteria assigned values may be manually or automatically modified based on time of year, time of day, current sales cycle, special sales programs, and so forth. For example, the value assigned to sales volume criteria may be low in the first quarter of a year. Yet, by the last quarter of the year vendors may have been expected to meet sales projections, and thus, a higher point value may be allotted to those vendors who have done so.

FIG. 4 depicts an exemplary BVC score table 400 having entries for two competing vendors. It should be understood that FIG. 4 is one of many potential architectural models for presenting the BVC score information, and, as such, should not limit the scope of the present invention. As shown in FIG. 4, the BVC score table 400 contains an "Activity or Document" column 405, a "Vendor A" column 410, and a "Vendor B" column 415. Additionally, the BVC score table 400 includes rows 420 for each of the sales differentiators, activities and/or documents, which corresponds with the rows 315 of FIG. 3. Furthermore, the BVC score table 400 includes a "Total BVC Score" row 425. More specifically, the "Activity or Document" column 405 contains sales differentiators, activities or documents as set forth in the point-value table 300 of FIG. 3. "Vendor A" column 410 and a "Vendor B" column 415 contain the points attained by each of the vendors for completing each of the sales differentiators, activities or documents listed in column 405. It should be understood that there may be additional vendors involved in the bid process. Thus, the BVC score table 400 may include an additional column for each additional vendor. Additionally, it should be understood that "Activity or Document" column 405 (as well as column 305 of FIG. 3) may contain additional sales differentiators, activities and/or documents. The use of a relational database, e.g., database 95, to store such data provides easy update capability for the vendor(s) using standard interfaces, such as, structured query language (SQL), while also providing rapid and customizable read access to the organization, e.g., Company XYZ, and other vendors.

As shown in FIG. 4, with this example, Vendor A provided all documentation and began working on the sales opportunity two months earlier than Vendor B resulting in a BVC score of twenty-four. Vendor B received no points for the earliest record opened data and also failed to include a client recommendation letter, resulting in a BVC score of twenty. Thus, with this example, Vendor A would win the BVC process and as a result, may receive special pricing or other special assistance from Company XYZ.

However, in embodiments, an organization may not offer the special pricing to a winner of the BVC process, or may not automatically offer any special pricing to a winner of the BVC process. For example, a company may decide to not offer a special pricing to the winner of the BVC process and/or may decide to offer a non-winner of the BVC process a special pricing. Additionally, for example, if the BVC score is within a specified number of points between two or more vendors, an audit may be performed prior to declaring a winner of the BVC process. In embodiments, the point differential prompting an audit may be simply a specific number of points, may be a ratio, may be triggered by specific data fields and documents, or other such criteria. In a further embodiment, the point winner of the BVC process would be conclusive and random audits may occur after the fact.

History Tracking Tool

The history tracking tool 75 provides the organization, e.g., Company XYZ, with a timeline record of which vendors accessed and added and/or updated information in the BVC server 14. For example, all entries, changes and/or updates to stored documents or field data may be recorded, e.g., in the database 95, with a time stamp and saved as a revision of the earlier document. For example, if a vendor changes or replaces an architecture overview document three times after initially loading it, three revisions would be saved in a history in, e.g., the database 95, and the active document would be revision four. Utilizing the history tracking tool 75 allows the organization to maintain a timeline of each vendor's activities. Moreover, the organization, e.g., Company XYZ may use the information obtained utilizing the history tracking tool 75, e.g., revision dates, number of revisions, etc., to review trends among vendors and also to settle any vendor activity disputes. In other embodiments, other history tracking systems, e.g., Wiki based services, may also be used.

Flow Diagram

The steps of the flow diagram described herein may be implemented in the environment of FIG. 1. The flow diagram may equally represent a high-level block diagram of the invention. The steps of the flow diagram may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

Figure 5:
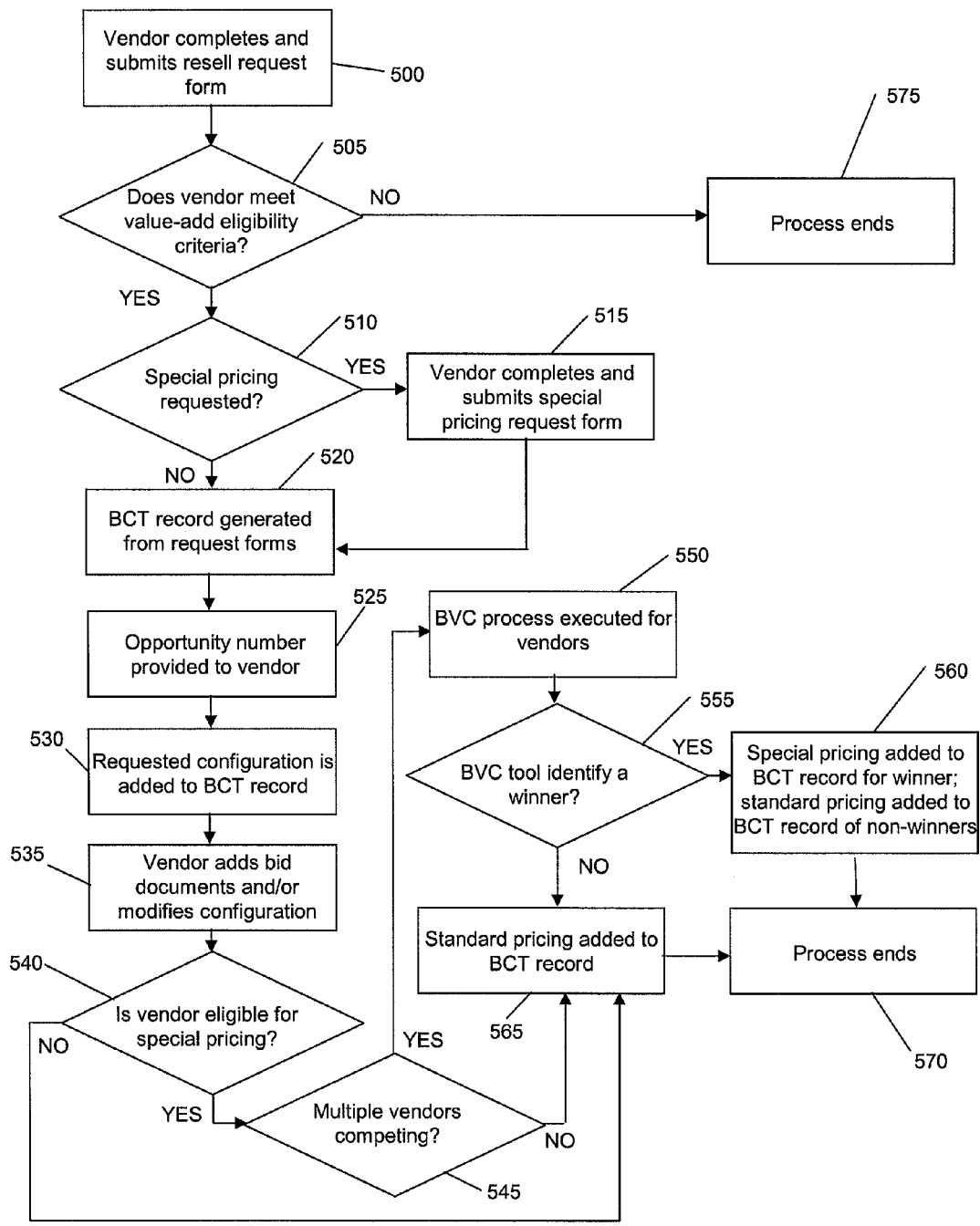
FIG. 5 is an exemplary flow chart of steps for implementing aspects of the invention.

FIG. 5 shows an exemplary flow diagram for performing steps of the invention. It should be understood that, as FIG. 5 is an exemplary flow chart, it should not limit the scope of the invention.

At step 500, a vendor completes and submits a resell request form via the BCT vendor interface. At step 505, the value-add eligibility determination tool determines whether the vendor meets the client's value-add eligibility criteria. If, at step 505, the value-add eligibility determination tool determines that the vendor does not meet the client's value-add eligibility criteria, the process continues at step 575, where the process ends for the vendor, and the vendor is eliminated from consideration. If, at step 505, the value-add eligibility determination tool determines the vendor does meet the client's value-add eligibility criteria, then, at step 510, a determination is made as to whether the vendor has requested special pricing (e.g., lower pricing than the standard wholesale pricing). If, at step 510, the vendor has requested special pricing, at step 515, the vendor completes and submits a special pricing request form. If, at step 510, the vendor has not requested special pricing, then the process continues at step 520.

At step 520, the BCT server generates a BCT record from the completed and submitted request forms. At step 525, the BCT server provides an opportunity number to the vendor. At step 530, the BCT server adds the requested configuration (or the product or service the vendor would like to sell) to the BCT record in the database. At step 535, the vendor adds and/or modifies bid documents and/or modifies the configuration (via the BCT vendor interface).

At step 540, the BCT server determines if the vendor is eligible for the special pricing. If, at step 540, the BCT server determines that the vendor is not eligible for the special pricing, the process continues at step 565. If, at step 540, the BCT server determines that the vendor is eligible for the special pricing, at step 545, the BCT server determines whether multiple vendors are competing for the same sales opportunity. If, at step 545, the BCT server determines that multiple vendors are not competing for the same sales opportunity, the process continues at step 565. If, at step 545, the BCT server determines that multiple vendors are competing for the same sales opportunity, at step 550, the BVC tool executes the BVC process for the competing vendors.

At step 555, a determination is made as to whether the BVC tool identified a winner of the BVC process. If, at step 555, the BVC tool did not identify a winner of the BVC process, then the process continues at step 565. If, at step 555, the BVC tool did identify a winner of the BVC process, then at step 560, the winner of the BVC process is offered special pricing, and an indication of the special pricing is added to the BCT record of the winner. Additionally, at step 560 the vendor(s) who did not win the BVC process are offered standard pricing, and an indication of the standard pricing is added to the BCT record of the vendor(s) who did not win the BVC process. At step 565, a vendor is offered standard pricing, and an indication of the standard pricing is added to the BCT record of the vendor. At step 570, the process ends.

It should be understood, that while the steps have been described as occurring in a particular order, the invention contemplates that the steps may be performed in other orders. For example, step 525 may occur before step 505. Furthermore, the invention contemplates that, in embodiments, steps may be implied or omitted while still remaining within the scope of this invention.

While the invention has been described in terms of embodiments, those skilled in the art will recognize that the invention can be practiced with modifications and in the spirit and scope of the appended claims.

What is claimed is:

1. A method implemented in a computer infrastructure having computer executable code, comprising:
   receiving information in support of a bid made by a vendor for a product or service provided by a supplier for eventual resale by the vendor to a target client, using a processor of the computer infrastructure, the information in support of the bid including value-add eligibility documentation that satisfies predetermined value-add eligibility criteria of the supplier, the value-add eligibility criteria includes services and support required by or beneficial to the target client;
   determining if the value-add eligibility criteria of the supplier is met by comparing the received value-add eligibility documentation to the predetermined value-add eligibility criteria and determining whether a threshold amount of the predetermined value-add eligibility criteria has been satisfied by the received value-add eligibility documentation using the processor of the computer infrastructure;
   if the value-add eligibility criteria is met, calculating a bid price based on the information using the processor of the computer infrastructure;
   updating a record indicating the bid price using the processor of the computer infrastructure; and
   tracking additions and changes to the record using the processor of the computer infrastructure.

2. The method of claim 1, wherein the receiving the information comprises translating the information.

3. The method of claim 1, further comprising providing a uniform interface for vendors to submit or modify the information.

4. The method of claim 1, wherein the calculating the bid price comprises:
   determining a standard pricing; and
   determining a special pricing, which is a pricing less than the standard pricing.

5. The method of claim 4, further comprising:
   determining if multiple vendors are competing for a same sales opportunity;
   determining if each of the multiple vendors would like to receive the special pricing;
   receiving documentation from each of the multiple vendors that would like to receive the special pricing that supports each vendor's reason for entitlement to the special pricing; and
   executing a bid value calculation to determine the bid price for each of the multiple vendors,
   wherein the information received in support of the bid documentation includes the documents received in support of each vendor's reason for entitlement to the special pricing.

6. The method of claim 5, wherein the executing the bid value calculation comprises determining an influence and contribution of each of the multiple vendors towards a successful sale and deployment for the same sales opportunity.

7. The method of claim 6, wherein the determining the influence and the contribution comprises determining at least one of completed sales differentiators, activities and documents for each of the vendors based on the information.

8. The method of claim 7, wherein the completed sales differentiators, activities and documents comprise at least one of: a record opened date; a completed configuration review; a completed system assurance review; an architecture overview document; an architecture detail document; an architecture diagram; and a client letter.

9. The method of claim 7, wherein the determining the influence and the contribution further comprises: assigning a point value to each of the completed sales differentiators, activities and documents; adding the assigned point value towards a total bid value calculation score of a vendor for each of the completed sales differentiators, activities and documents; and at an end of a predetermined bid process period, determining the total bid value calculation score for each of the vendors.

10. The method of claim 9, wherein a vendor having a highest total bid value calculation score at the end of the bid process is a winner of a bid value calculation.

11. The method of claim 10, further comprising: offering the winner of the bid value calculation a special pricing; and offering non-winners of the bid value calculation a standard pricing.

12. The method of claim 9, wherein, if the total bid value calculation score for each of a plurality of vendors is within a predetermined range, performing an audit prior to determining a winner of the bid value calculation.

13. The method of claim 4, further comprising:
   determining that the vendor requested the special pricing;
   determining that the vendor is eligible for the special pricing;
   determining the bid made by the vendor is a winner;
   offering the winner the special pricing, which is less than the standard pricing, and adding an indication of the special pricing to a bid certification tool record of the winner; and
   offering other vendors that meet the value-add eligibility criteria the standard pricing and adding an indication of the standard pricing to a bid certification tool record of each of the other vendors.

14. The method of claim 1, further comprising receiving a request to participate in a sales opportunity; and providing an opportunity number.

15. The method of claim 1, wherein meeting the threshold amount of the predetermined value-add eligibility criteria comprises one of: meeting all of the value-add eligibility criteria; meeting key criteria of the value-add eligibility criteria; and meeting a predefined percentage of the value-add eligibility criteria.

16. The method of claim 1, further comprising storing the bid certification record in a database.

17. The method of claim 1, wherein a service provider at least one of creates, maintains, deploys and supports the computer infrastructure that performs the steps of claim 1.

18. The method of claim 1, wherein steps of claim 1 are provided by a service provider on a subscription, advertising, and/or fee basis.

19. A system, comprising:
a bid certification tool vendor interface configured to provide a uniform interface to add or modify information in a bid certification tool record in support of a bid made by a vendor for a product or service provided by a supplier for eventual resale by the vendor to a target client, the information in support of the bid including value-add eligibility documentation that satisfies predetermined value-add eligibility criteria of the supplier, the value-add eligibility criteria includes services and support required by or beneficial to the target client;
a form loader tool configured to translate the information, when necessary, prior to adding the information to the bid certification tool record;
a value-add eligibility determination tool configured to determine whether the value-add eligibility criteria of the supplier is met by comparing the received value-add eligibility documentation to the predetermined value-add eligibility criteria and determining whether a threshold amount of the predetermined value-add eligibility criteria has been satisfied by the received value-add eligibility documentation;
a bid pricer tool providing an interface with a pricing tool configured to determine a standard price based on the information; and
a bid value calculation tool configured to determine a bid value calculation score based on the information and update the bid certification tool record to indicate a special pricing.

20. The system of claim 19, further comprising a history tracking tool configured to track additions and modifications to the bid certification tool record.

21. The system of claim 20, further comprising a computer infrastructure operable to implement the bid certification tool vendor interface, the form loader tool, the value-add eligibility determination tool, the bid pricer tool, the bid value calculation tool, and the history tracking tool.

22. The system of claim 21, wherein a service provider at least one of creates, maintains, deploys and supports the computer infrastructure.

23. A computer program product comprising a computer usable medium having readable program code embodied in the medium, the computer program product includes at least one component to:
receive information in support of a bid made by a vendor for a product or service provided by a supplier for eventual resale by the vendor to a target client, in a bid certification tool record, the information in support of the bid including value-add eligibility documentation that satisfies predetermined value-add eligibility criteria of the supplier, the value-add eligibility criteria includes services and support required by or beneficial to the target client;
determine if the value-add eligibility criteria of the supplier is met by comparing the received value-add eligibility documentation to the predetermined value-add eligibility criteria and determining whether a threshold amount of the predetermined value-add eligibility criteria has been satisfied by the received value-add eligibility documentation;
calculate a bid price based on the information if the value-add eligibility criteria is met;
update the bid certification tool record indicating the bid price; and
track additions and modifications to the bid certification tool record.

24. A method comprising:
providing a computer infrastructure operable to:
receive by a processor information in support of a bid made by a vendor for a product or service provided by a supplier for eventual resale by the vendor to a target client, in a bid certification tool record, the information in support of the bid including value-add eligibility documentation that satisfies predetermined value-add eligibility criteria of the supplier, the value-add eligibility criteria includes services and support required by or beneficial to the target client;
determine by the processor if the value-add eligibility criteria of the supplier is met by comparing the received value-add eligibility documentation to the predetermined value-add eligibility criteria and determining whether a threshold amount of the predetermined value-add eligibility criteria has been satisfied by the received value-add eligibility documentation;
calculate by the processor a bid price based on the information if the value-add eligibility criteria is met;
update by the processor the bid certification tool record indicating the bid price; and
track by the processor additions and modifications to the bid certification tool record.

* * * * *